US012198602B2

(12) United States Patent
Deng et al.

(10) Patent No.: US 12,198,602 B2
(45) Date of Patent: Jan. 14, 2025

(54) GATE DRIVE CIRCUIT AND DISPLAY PANEL CAPABLE OF OUTPUTTING HIGH POTENTIAL SIGNAL TO A PULL-UP NODE BY CONDUCTING VOLTAGE HOLDING CIRCUIT

(71) Applicant: Guangzhou China Star Optoelectronics Semiconductor Display Technology Co., LTd., Guangdong (CN)

(72) Inventors: Minghu Deng, Guangdong (CN); Xinru Yao, Guangdong (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 18/308,613

(22) Filed: Apr. 27, 2023

(65) Prior Publication Data

US 2024/0312390 A1 Sep. 19, 2024

(30) Foreign Application Priority Data

Mar. 17, 2023 (CN) ......................... 202310270264.8

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
None
See application file for complete search history.

(56) References Cited

U.S. PATENT DOCUMENTS

2017/0108989 A1* 4/2017 Gu ........................ G06F 3/0412
2019/0096353 A1* 3/2019 Tanaka .................. G06F 3/0416
2019/0206293 A1* 7/2019 Tian ....................... G11C 19/28
2021/0241673 A1* 8/2021 Liu ...................... G09G 3/2092

OTHER PUBLICATIONS

Integrated gate driver circuit technology with IGZO TFT forsensing operation (Year: 2019).*

* cited by examiner

*Primary Examiner* — Amr A Awad
*Assistant Examiner* — Donna V Bocar
(74) *Attorney, Agent, or Firm* — PV IP PC; Wei Te Chung

(57) ABSTRACT

Embodiments of the present disclosure are directed to a gate drive circuit and a display panel. The gate drive circuit includes a plurality of cascaded gate drive units. The N-level gate drive unit includes a pull-up transistor, a touch transistor, and a voltage holding circuit. An input end of the voltage holding circuit is connected with a high potential line, a first control end of the voltage holding circuit is connected with a touch line, a second control end of the voltage holding circuit is connected with a pull-up node, and an output end of the voltage holding circuit is connected with the pull-up node. The display panel includes a common voltage line and the gate drive circuit mentioned above, thereby alleviating the technical problem of unstable potential of pull-up nodes during a touch stage.

16 Claims, 3 Drawing Sheets

GATE DRIVE CIRCUIT AND DISPLAY PANEL CAPABLE OF OUTPUTTING HIGH POTENTIAL SIGNAL TO A PULL-UP NODE BY CONDUCTING VOLTAGE HOLDING CIRCUIT

CROSS REFERENCE TO RELATED APPLICATION

This application claims priority to Chinese Application No. 202310270264.8, filed on Mar. 17, 2023. The entire disclosure of the above application is incorporated herein by reference.

FIELD OF THE INVENTION

The present disclosure relates to the field of display technology, more particularly, to a gate drive circuit and a display panel.

BACKGROUND

The gate drive circuit is used to provide corresponding scanning signals to each scan line, including a plurality of gate drive units. The pull-up nodes of each of the gate drive units need corresponding potentials at different stages to achieve the required functions.

SUMMARY

An embodiment of the present disclosure is directed to a gate drive circuit and a display panel to alleviate the technical problem of unstable potential of a pull-up node during a touch stage.

In the first aspect, an embodiment of the present disclosure is directed to a gate drive circuit, which comprises a plurality of cascaded gate drive units. The N-level gate drive unit comprises a pull-up transistor, a touch transistor, and a voltage holding circuit. A first electrode of the pull-up transistor is connected with a clock line, a second electrode of the pull-up transistor is connected with an Nth level scan line, and a gate of the pull-up transistor is connected with a pull-up node. A first electrode of the touch transistor is connected with the Nth level scan line, a second electrode of the touch transistor is connected with a first low potential line, and a gate of the touch transistor is connected with a touch line. An input end of the voltage holding circuit is connected with a high potential line, a first control end of the voltage holding circuit is connected with the touch line, a second control end of the voltage holding circuit is connected with the pull-up node, and an output end of the voltage holding circuit is connected with the pull-up node.

Optionally, the voltage holding circuit comprises a first transistor, comprising a first electrode connected with a gate and the pull-up node of the first transistor; and a second transistor, comprising a first electrode connected with a second electrode of the first transistor, a second electrode connected with the high potential line, and a gate connected with the touch line.

Optionally, the voltage holding circuit is used to maintain a potential of the pull-up node during a touch stage.

Optionally, a channel type of the touch transistor is the same as a channel type of the second transistor, and the first transistor is an N-channel type thin film transistor.

Optionally, the touch line is used for transmitting a touch signal, and a potential of the touch signal and the potential of the pull-up node are both high potentials during the touch stage.

Optionally, the N-level gate drive unit further comprises a pull-up maintaining transistor, which comprises a first electrode connected with the high potential line, a second electrode connected with the pull-up node, and a gate connected with a first control line.

Optionally, the N-level gate drive unit further comprises: a third transistor, comprising a first electrode connected with a gate of the third transistor and the high potential line; a fourth transistor, comprising a first electrode connected with a second electrode of the third transistor, a second electrode connected with a second low potential line, and a gate connected with the pull-up node; a fifth transistor, comprising a first electrode connected with the high potential line, and a second electrode connected with the first electrode of the fourth transistor; a sixth transistor, comprising a first electrode connected with the second electrode of the fifth transistor, a second electrode connected with the second low potential line, and a gate connected with the gate of the fourth transistor; and a seventh transistor, comprising a gate connected with the first electrode of the sixth transistor, a first electrode connected with the pull-up node, and a second electrode connected with the first low potential line.

Optionally, the third transistor, the fourth transistor, the fifth transistor, the sixth transistor, and the seventh transistor are all N-channel type thin film transistors. The first low potential line is used for transmitting a first low potential signal, the second low potential line is used for transmitting a second low potential signal, and a potential of the second low potential signal is smaller than a potential of the first low potential signal.

Optionally, the N-level gate drive unit further comprises an eighth transistor, which comprises a first electrode connected with the Nth level scan line, a second electrode connected with the first low potential line, and a gate connected with the gate of the seventh transistor, and the eighth transistor is an N-channel type thin film transistor.

In the second aspect, an embodiment of the present disclosure is directed to a display panel, which comprises a common voltage line and a gate drive circuit in at least one embodiment. The common voltage line is used for transmitting a common voltage signal, and the clock line is used for transmitting a clock signal. A frequency of the clock signal during the touch stage is greater than a frequency of the clock signal during a display stage, and a waveform of the clock signal during the touch stage is the same as a waveform of the common voltage signal during the touch stage.

The gate drive circuit and the display panel of the present disclosure are capable of outputting the high potential signal transmitted in the high potential line to the pull-up node by conducting the voltage holding circuit during the touch stage, continuously injecting high potential signals into the pull-up node, thereby ensuring that the pull-up node maintains high potential during the touch stage.

Furthermore, the first control end of the voltage holding circuit and the gate of the touch transistor may share the same touch line, which can save the number of wires required for the gate drive circuit, thereby reducing the border space and facilitating the implementation of narrow borders.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

The specific structural and functional details disclosed herein are representative only and are for the purpose of describing exemplary embodiments of the present application. However, the present application may be embodied in many alternative forms and should not be construed as being limited only to the embodiments set forth herein.

It is understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

It should be understood that, when an element or layer is referred to herein as being "disposed on", "connected to" or "coupled to" another element or layer, it can be directly disposed on, connected or coupled to the other element or layer, or alternatively, that intervening elements or layers may be present. In contrast, when an element is referred to as being "directly disposed on," "directly connected to" or "directly coupled to" another element or layer, there are no intervening elements or layers present. In the figures, like numbers refer to like elements throughout.

It will be further understood that the term "and/or" includes any and all combinations of one or more of the associated listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
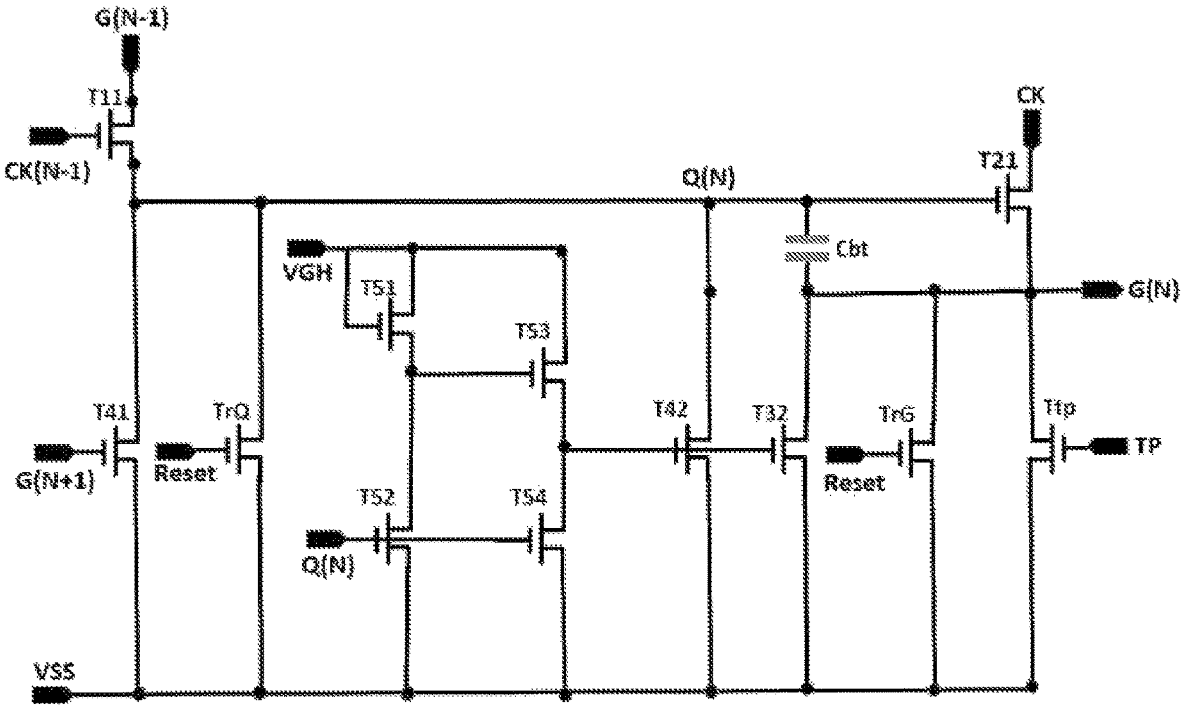
Fig. 1 (Related art)
FIG. 1 is a circuit diagram of a gate drive circuit in related art.
Figure 2:
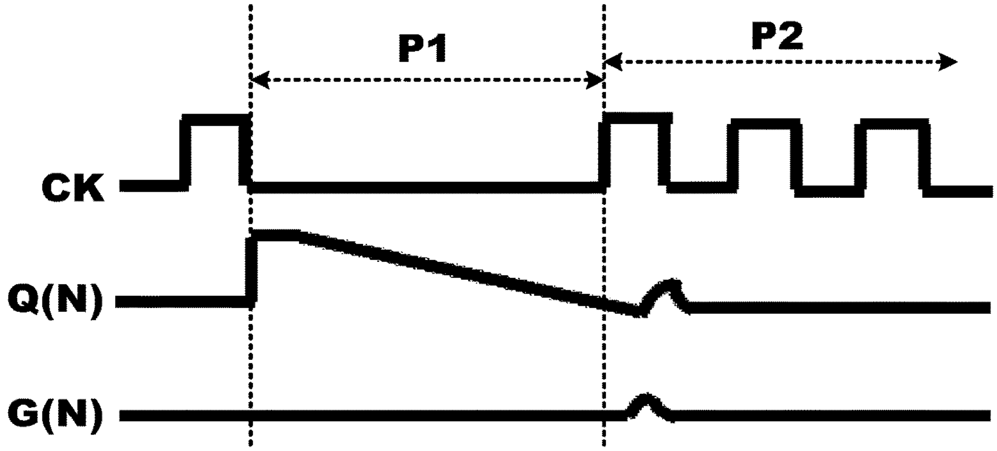
Fig. 2 (Related art)
FIG. 2 illustrates waveforms of key signals in the gate drive circuit shown in FIG. 1.

FIG. 1 is a circuit diagram of a gate drive circuit in related art, and FIG. 2 illustrates waveforms of a timing of key signals in the gate drive circuit shown in FIG. 1. The gate drive circuit shown in FIG. 1 has the following problems:

1. In a touch stage P1 shown in FIG. 2, due to a longer time (e.g. 300 microseconds) between adjacent display stages P2, both a clock signal CK and an Nth level scan signal G (N) are at low potentials. A potential of a pull-up node Q (N) continuously decreases as the touch stage P1 continues.

2. One electrode of a pull-up maintaining transistor T11 is connected with an N−1th level scan line, which is used to transmit an N−1th level scan signal G (N−1). When the potential of the pull-up node Q (N) is higher than a potential of the N−1th level scan signal G (N−1), a charge capacity of the pull-up node Q (N) is easily leaked to the N−1th level scan line through the pull-up maintaining transistor T11, which also makes it difficult to stabilize the potential of the pull-up node Q (N).

3. When the potential of the pull-up node Q (N) is high, a sixth transistor T54 conducts, and a gate potential of a seventh transistor T42 and a source potential of the seventh transistor T42 are both a potential of a first low potential signal VSS. This can easily lead to incomplete closure of the seventh transistor T42, and the charge capacity of the pull-up node Q (N) is easily leaked to a first low potential line through the seventh transistor T42, which also makes it difficult to stabilize the potential of the pull-up node Q (N).

Figure 3:
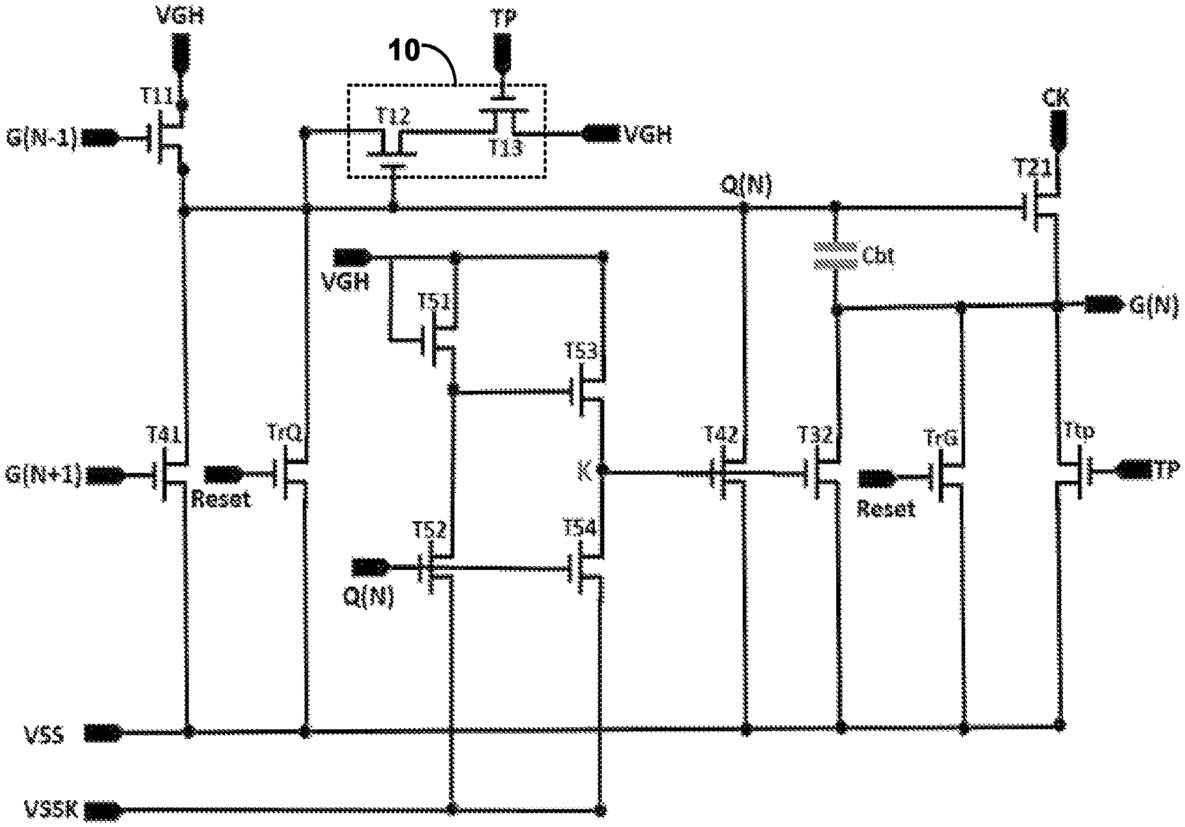
FIG. 3 is a circuit diagram of a gate drive circuit according to one embodiment of the present disclosure.
Figure 4:
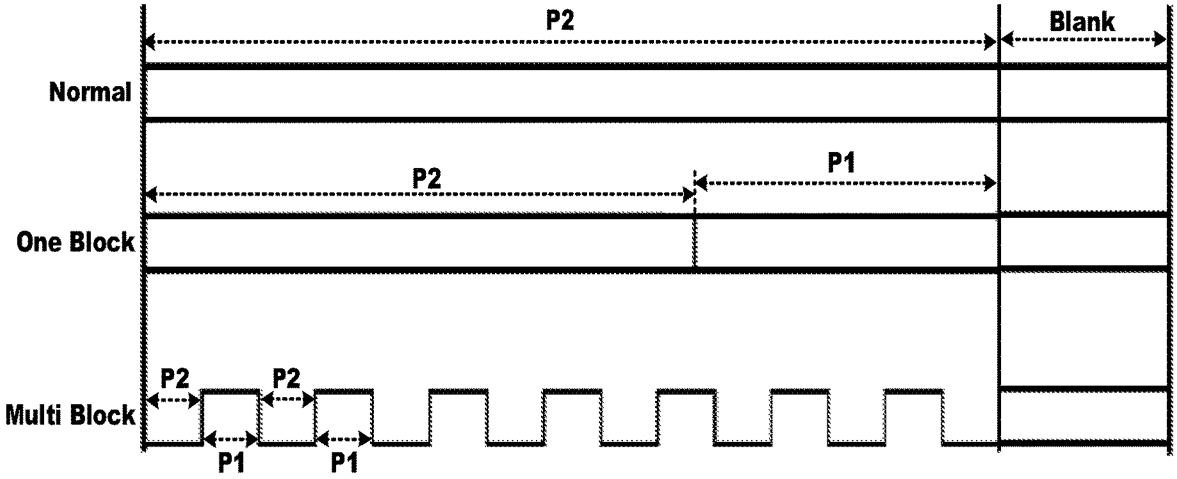
Fig. 4 (Related art)
FIG. 4 illustrates waveforms of signals when the conventional gate drive circuit is operated under an operating mode.
Figure 5:
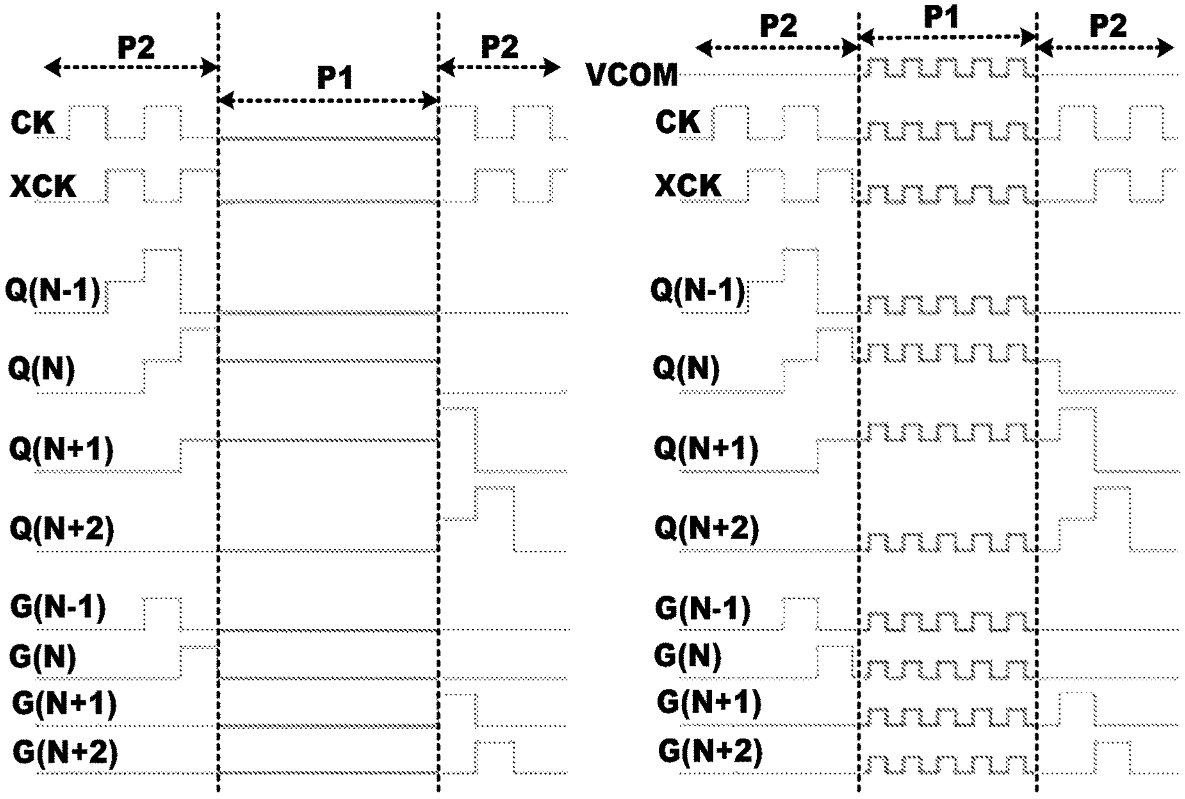
FIG. 5 illustrates a timing comparison of a display panel according to one embodiment of the present disclosure.

Considering the technical issue of unstable potential of the pull-up node Q (N) in the touch stage P1 mentioned above, an embodiment of the present disclosure is directed to a gate drive circuit, as shown in FIGS. 3 to 5. The gate drive circuit comprises a plurality of cascaded gate drive units, wherein the N-level gate drive unit comprises an pull-up transistor T21, a touch transistor Ttp, and a voltage holding circuit 10. A first electrode of the pull-up transistor T21 is connected with a clock line, a second electrode of the pull-up transistor T21 is connected with an Nth level scan line, and a gate of the pull-up transistor T21 is connected with a pull-up node Q (N). A first electrode of the touch transistor Ttp is connected with the Nth level scan line, a second electrode of the touch transistor Ttp is connected with a first low potential line, and a gate of the touch transistor Ttp is connected with a touch line. An input end of the voltage holding circuit 10 is connected with a high potential line, a first control end of the voltage holding circuit 10 is connected with the touch line, a second control end of the voltage holding circuit 10 is connected with the pull-up node Q (N), and an output end of the voltage holding circuit 10 is connected with the pull-up node Q (N).

In this embodiment, the gate drive circuit of the present disclosure is capable of outputting a high potential signal VGH transmitted in a high potential line to the pull-up node Q (N) by turning on the voltage holding circuit 10 during the touch stage P1, continuously injecting the high potential signal VGH into the pull-up node Q (N), thereby ensuring that the pull-up node Q (N) maintains a high potential during the touch stage P1.

Furthermore, the first control end of the voltage holding circuit 10 and the gate of the touch transistor Ttp may share the same touch line, which can save the number of wires required for the gate drive circuit, thereby reducing the border space and facilitating the implementation of narrow borders.

The voltage holding circuit 10 is used to maintain a potential of the pull-up node Q(N) during the touch stage P1. The touch line is used for transmitting a touch signal TP, and a potential state of the touch signal TP is used to indicate an arrival of the touch stage P1. For example, if the touch signal TP is at a high potential, it indicates that it is currently touch stage P1. That is to say, a potential of the touch signal TP and the potential of the pull-up node Q (N) are both high potentials during the touch stage P1.

A first electrode is one of a source or drain electrodes, and a second electrode is the other of the source or drain electrodes. For example, when the first electrode is the source electrode, the second electrode is the drain electrode. Alternatively, when the first electrode is the drain electrode, the second electrode is the source electrode.

The voltage holding circuit 10 comprises a first transistor T12 and a second transistor T13, and a first electrode of the first transistor T12 connected with a gate and the pull-up node Q (N) of the first transistor T12. A first electrode of the second transistor T13 is connected with a second electrode of the first transistor T12, a second electrode of the second transistor T13 is connected with the high potential line, and a gate of the second transistor T13 is connected with the touch line.

Due to the fact that a channel type of the touch transistor Ttp is the same as a channel type of the second transistor T13, and the first transistor T12 is an N-channel type thin film transistor, when the touch signal TP transmitted in the touch line is at a high potential, the touch transistor Ttp and the second transistor T13 conduct synchronously. At this time, due to the high potential of the pull-up node Q (N), the first transistor T12 is also in a conduction state, The high potential signal VGH transmitted in the high potential line is written to the pull-up node Q (N), continuously charging the pull-up node Q (N) to maintain the high potential during the touch stage P1.

The N-level gate drive unit also comprises a pull-up maintaining transistor T11, a first electrode of the pull-up maintaining transistor T11 is connected with the high potential line, a second electrode of the pull-up maintaining transistor T11 is connected with the pull-up node Q (N), and a gate of the pull-up maintaining transistor T11 is connected with a first control line.

During the touch stage P1, the pull-up maintaining transistor T11 is in a cut-off state. Compared to the N−1th level scan signal G (N−1) connected with the first electrode of the pull-up maintaining transistor T11 shown in FIG. 1, a potential of the high potential signal VGH in the high potential line is greater than or equal to the potential of the pull-up node Q (N), which can prevent the charge capacity of the pull-up node Q (N) from leaking through the pull-up maintaining transistor T11, thereby further stabilizing the potential of the pull-up node Q (N).

The first control line may be used for transmitting the clock signal CK (N−1) shown in FIG. 1 or the Nth level scan signal G (N−1) shown in FIG. 2.

The N-level gate drive unit also comprises a third transistor T51, a fourth transistor T52, a fifth transistor T53, a sixth transistor T54, and a seventh transistor T42. A first electrode of the third transistor T51 is connected with a gate and the high potential line of the third transistor T51. A first electrode of the fourth transistor T52 is connected with a second electrode of the third transistor T51, a second electrode of the fourth transistor T52 is connected with a second low potential line, and a gate of the fourth transistor T52 is connected with the pull-up node Q (N). A first electrode of the fifth transistor T53 is connected with the high potential line, and a second electrode of the fifth transistor T53 is connected with the first electrode of the fourth transistor T52. A first electrode of the sixth transistor T54 is connected with the second electrode of the fifth transistor T53, a second electrode of the sixth transistor T54 is connected with the second low potential line, and a gate of the sixth transistor T54 is connected with the gate of the fourth transistor T52. A gate of the seventh transistor T42 is connected with the first electrode of the sixth transistor T54, a first electrode of the seventh transistor T42 is connected with the pull-up node Q (N), and a second with of the seventh transistor T42 is connected with the first low potential line.

The third transistor T51, the fourth transistor T52, the fifth transistor T53, and the sixth transistor T54 can form an inverter, with node K as the output terminal of the inverter. When the pull-up node Q (N) is at a high potential, node K is at a low potential. When the pull-up node Q (N) is at a low potential, node K is at a high potential.

A high potential is a potential that can turn on an N-channel transistor or turn off a P-channel transistor, while a low potential is a potential that can turn off an N-channel transistor or turn on a P-channel transistor.

Due to the fact that the third transistor T51, the fourth transistor T52, the fifth transistor T53, the sixth transistor T54, and the seventh transistor T42 are all N-channel type thin film transistors. The first low potential line is used for transmitting the first low potential signal VSS, and the second low potential line is used for transmitting the second low potential signal VSSK. The potential of the second low potential signal VSSK is smaller than the potential of the first low potential signal VSS. When the pull-up node Q (N) is at a high potential, the sixth transistor T54 conducts, and a gate potential of the seventh transistor T42 is the potential of the second low potential signal VSSK. A source potential of the seventh transistor T42 is the potential of the first low potential signal VSS. At this time, the gate source potential difference (Vgs) of the seventh transistor T42 is less than 0, which can completely shut down the seventh transistor T42 and prevent the pull-up node Q (N) from leaking through the seventh transistor T42, further stabilizing the potential of the pull-up node Q (N).

The N-level gate drive unit also comprises an eighth transistor T32, a first electrode of the eighth transistor T32 is connected with the Nth level scan line, a second electrode of the eighth transistor T32 is connected with the first low potential line, a gate of the eighth transistor T32 is connected with the gate of the seventh transistor T42, and the eighth transistor T32 is an N-channel type thin film transistor.

When the pull-up node Q (N) is at a high potential, the sixth transistor T54 conducts, a gate potential of the eighth transistor T32 is the potential of the second low potential signal VSSK, and a source potential of the eighth transistor T32 is the potential of the first low potential signal VSS. At this time, the gate source potential difference (Vgs) of the eighth transistor T32 is less than 0, which can more completely close the eighth transistor T32 and prevent leakage of the Nth level scan line through the seventh transistor T42, further stabilizing the potential of the Nth level scan signal G (N).

The N-level gate drive unit also comprises a bootstrap capacitor Cbt, one end of which is connected with the pull-up node Q (N), and the other end of the bootstrap capacitor Cbt is connected with the Nth level scan line.

The N-level gate drive unit also comprises transistor T41, a first electrode of transistor T41 is connected with the pull-up node Q (N), a second electrode of the transistor T41 is connected with the first low potential line, and a gate of the transistor T41 is connected with an N+1th level scan line.

Among them, the N+1th level scan line is used for transmitting an N+1th level scan signal.

The N-level gate drive unit also comprises a transistor TrQ, a first electrode of the transistor TrQ is connected with the pull-up node Q (N), a second electrode of the transistor TrQ is connected with the first low potential line, and a gate of the transistor TrQ is connected with a reset line.

Among them, the reset line is used for transmitting a reset signal Reset.

The N-level gate drive unit also comprises a transistor TrG, a first electrode of the transistor TrG is connected with the Nth level scan line, a second electrode of the transistor TrG is connected with the first low potential line, and a gate of the transistor TrG is connected to the reset line.

The gate of transistor TrQ and the gate of transistor TrG may share the same reset line, which can save the number of wires required for the gate drive circuit, thereby reducing the border space and facilitating the implementation of narrow borders.

The above transistors may all be N-channel type thin film transistors, which simplifies the production process and improves production efficiency by using the same channel type thin film transistors in the same gate drive circuit.

FIG. 4 illustrates waveforms of signals when the conventional gate drive circuit is operated under an operating mode, where the Normal line shows the normal operating mode, which only includes a display stage P2 and a blank stage (Blank) in one frame. The One Block line shows the operating mode of time-sharing simplex, which includes the display stage P2, the touch stage P1, and the blank stage (Blank) in one frame. The Multi Block line shows the operating mode of time-sharing multiplexing, which includes a plurality of alternating display stages P2, the touch stage P1, and the final blank stage (Blank) in a frame.

Preferably, in this embodiment, the gate drive circuit of the present disclosure operates in a time-sharing multiplexing mode, which allows for more timely corresponding touch operation, thereby improving the touch response speed.

FIG. 5 illustrates waveforms of a timing comparison of a display panel according to one embodiment of the present disclosure. In a time-sharing multiplexing working mode that includes a plurality of alternating display stages P2 and the touch stage P1 in one frame, the right figure in FIG. 5 shows the clock signal CK, a clock signal XCK, an N−1th level pull-up node Q (N−1), the pull-up node Q (N), an N+1th level pull-up node Q (N+1), an N+2th level pull-up node Q (N+2), and the N−1th level scan signal G (N−1). The Nth level scan signal G (N), the N+1th level scan signal G (N+1), and the N+2th level scan signal G (N+2) maintain a fixed potential during the touch stage P1 and do not change with the potential change of the common voltage signal. This can easily increase the coupling capacitance with a common voltage line, thereby affecting the touch effect.

In view of this, the potential of the pull-up node Q (N) is maintained at a high potential during the touch stage P1, the pull-up transistor T21 is in a conductive state, and the clock signal CK or the clock signal XCK adopts the same waveform as the common voltage signal as shown in the right figure in FIG. 5, thereby generating these scan signals that are the same as the common voltage signal, which can reduce the capacitive coupling between the scan line and the common voltage line.

This embodiment of the present disclosure is directed to a display panel, which comprises a common voltage line and a gate drive circuit in at least one embodiment. The common voltage line is used for transmitting a common voltage signal, and the clock line is used for transmitting a clock signal CK. A frequency of the clock signal CK during the touch stage P1 is greater than a frequency of the clock signal CK during the display stage P2, and a waveform of the clock signal CK during the touch stage P1 is the same as a waveform of the common voltage signal during the touch stage P1.

In this embodiment, the display panel of the present disclosure comprises a gate drive circuit in at least one of the above embodiments, which can also output the high potential signal VGH transmitted in the high potential line to the pull-up node Q (N) by turning on the voltage holding circuit 10 during the touch stage P1. It can continuously inject the high potential signal VGH into the pull-up node Q (N), thereby ensuring that the pull-up node Q (N) maintains a high potential during the touch stage P1.

The first control end of the voltage holding circuit 10 and the gate of the touch transistor Ttp may share the same touch line, which can save the number of wires required for the gate drive circuit, thereby reducing the border space and facilitating the realization of narrow borders.

The display panel mentioned above may be, but are not limited thereto, a liquid crystal display panel, or other display panels, such as a self-luminescent display panel.

The descriptions of each embodiment have their own emphases, and for parts not described in detail in a certain embodiment, reference may be made to relevant descriptions of other embodiments.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A gate drive circuit comprising a plurality of cascaded gate drive units, an N-level gate drive unit comprising:

a pull-up transistor, comprising a first electrode connected with a clock line, a second electrode connected with an Nth level scan line, and a gate connected with a pull-up node;

a touch transistor, comprising a first electrode connected with the Nth level scan line, a second electrode connected with a first low potential line, and a gate connected with a touch line; and a voltage holding circuit, comprising an input end connected with a high potential line, a first control end is connected with the touch line, a second control end connected with the pull-up node, and an output end connected with the pull-up node, wherein the N-level gate drive unit further comprises:

a third transistor, comprising a first electrode connected with a gate of the third transistor and the high potential line;

a fourth transistor, comprising a first electrode connected with a second electrode of the third transistor, a second electrode connected with a second low potential line, and a gate connected with the pull-up node;

a fifth transistor, comprising a first electrode connected with the high potential line, and a second electrode connected with the first electrode of the fourth transistor;

a sixth transistor, comprising a first electrode connected with the second electrode of the fifth transistor, a second electrode connected with the second low potential line, and a gate connected with the gate of the fourth transistor; and a seventh transistor, comprising a gate connected with the first electrode of the sixth transistor, a first electrode connected with the pull-up node, and a second electrode connected with the first low potential line.

2. The gate drive circuit as claimed in claim 1, wherein the voltage holding circuit comprises:

a first transistor, comprising a first electrode connected with a gate and the pull-up node of the first transistor; and a second transistor, comprising a first electrode connected with a second electrode of the first transistor, a second electrode connected with the high potential line, and a gate connected with the touch line.

3. The gate drive circuit as claimed in claim 2, wherein the voltage holding circuit is used to maintain a potential of the pull-up node during a touch stage.

4. The gate drive circuit as claimed in claim 3, wherein a channel type of the touch transistor is the same as a channel type of the second transistor, and the first transistor is an N-channel type thin film transistor.

5. The gate drive circuit as claimed in claim 4, wherein the touch line is used for transmitting a touch signal, and a potential of the touch signal and the potential of the pull-up node are both high potentials during the touch stage.

6. The gate drive circuit as claimed in claim 1, wherein the N-level gate drive unit further comprises a pull-up maintaining transistor, which comprises a first electrode connected with the high potential line, a second electrode connected with the pull-up node, and a gate connected with a first control line.

7. The gate drive circuit as claimed in claim 1, wherein the third transistor, the fourth transistor, the fifth transistor, the sixth transistor, and the seventh transistor are all N-channel type thin film transistors; and the first low potential line is used for transmitting a first low potential signal, the second low potential line is used for transmitting a second low potential signal, and a potential of the second low potential signal is smaller than a potential of the first low potential signal.

8. The gate drive circuit as claimed in claim 7, wherein the N-level gate drive unit further comprises an eighth transistor, which comprises a first electrode connected with the Nth level scan line, a second electrode connected with the first low potential line, and a gate connected with the gate of the seventh transistor, and the eighth transistor is an N-channel type thin film transistor.

9. A display panel, comprising a common voltage line and a gate drive circuit comprising a plurality of cascaded gate drive units, an N-level gate drive unit comprising:

a pull-up transistor, comprising a first electrode connected with a clock line, a second electrode connected with an Nth level scan line, and a gate connected with a pull-up node;

a touch transistor, comprising a first electrode connected with the Nth level scan line, a second electrode connected with a first low potential line, and a gate connected with a touch line; and a voltage holding circuit, comprising an input end connected with a high potential line, a first control end is connected with the touch line, a second control end connected with the pull-up node, and an output end connected with the pull-up node;

wherein the common voltage line is used for transmitting a common voltage signal, and the clock line is used for transmitting a clock signal, a frequency of the clock signal during a touch stage is greater than a frequency of the clock signal during a display stage, and a waveform of the clock signal during the touch stage is the same as a waveform of the common voltage signal during the touch stage, wherein the N-level gate drive unit further comprises:

a third transistor, comprising a first electrode connected with a gate of the third transistor and the high potential line;

a fourth transistor, comprising a first electrode connected with a second electrode of the third transistor, a second electrode connected with a second low potential line, and a gate connected with the pull-up node;

a fifth transistor, comprising a first electrode connected with the high potential line, and a second electrode connected with the first electrode of the fourth transistor;

a sixth transistor, comprising a first electrode connected with the second electrode of the fifth transistor, a second electrode connected with the second low potential line, and a gate connected with the gate of the fourth transistor; and a seventh transistor, comprising a gate connected with the first electrode of the sixth transistor, a first electrode connected with the pull-up node, and a second electrode connected with the first low potential line.

10. The display panel as claimed in claim 9, wherein the voltage holding circuit comprises: a first transistor, comprising a first electrode connected with a gate and the pull-up node of the first transistor; and a second transistor, comprising a first electrode connected with a second electrode of the first transistor, a second electrode connected with the high potential line, and a gate connected with the touch line.

11. The display panel as claimed in claim 10, wherein the voltage holding circuit is used to maintain a potential of the pull-up node during a touch stage.

12. The display panel as claimed in claim 11, wherein a channel type of the touch transistor is the same as a channel type of the second transistor, and the first transistor is an N-channel type thin film transistor.

13. The display panel as claimed in claim 12, wherein the touch line is used for transmitting a touch signal, and a potential of the touch signal and the potential of the pull-up node are both high potentials during the touch stage.

14. The display panel as claimed in claim 9, wherein the N-level gate drive unit further comprises a pull-up maintaining transistor, which comprises a first electrode connected with the high potential line, a second electrode connected with the pull-up node, and a gate connected with a first control line.

15. The display panel as claimed in claim 9, wherein the third transistor, the fourth transistor, the fifth transistor, the sixth transistor, and the seventh transistor are all N-channel type thin film transistors; and the first low potential line is used for transmitting a first low potential signal, the second low potential line is used for transmitting a second low potential signal, and a potential of the second low potential signal is smaller than a potential of the first low potential signal.

16. The display panel as claimed in claim 15, wherein the N-level gate drive unit further comprises an eighth transistor, which comprises a first electrode connected with the Nth level scan line, a second electrode connected with the first low potential line, and a gate connected with the gate of the seventh transistor, and the eighth transistor is an N-channel type thin film transistor.

* * * * *